Sept. 3, 1974            D. ADOMAITIS           3,833,700
PROCESS FOR CLOSING TUBULAR PARISONS AND BLOW
MOLDING HOLLOW CONTAINERS THEREFROM
Filed March 9, 1972                                          2 Sheets-Sheet 1
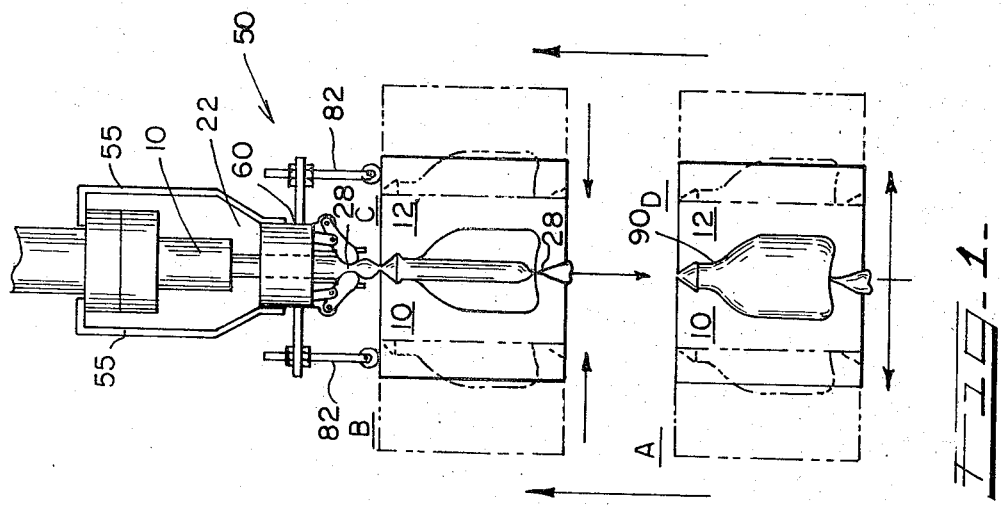
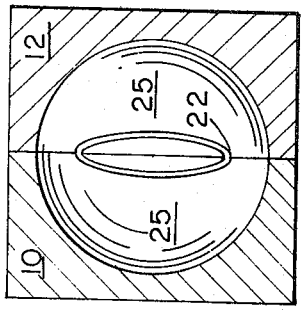
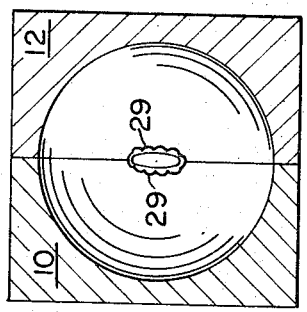
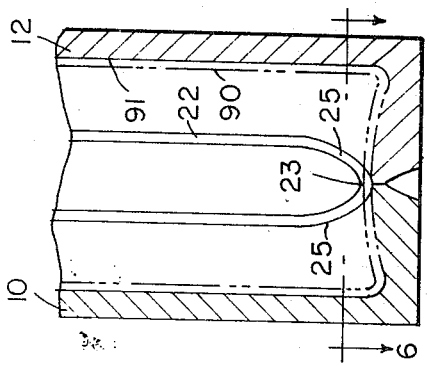
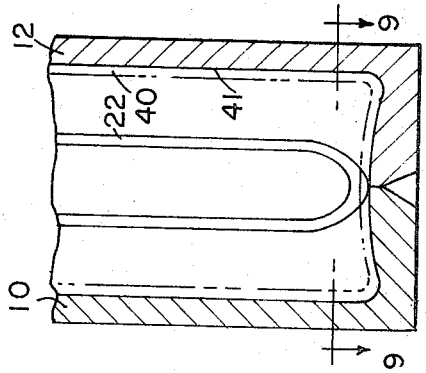
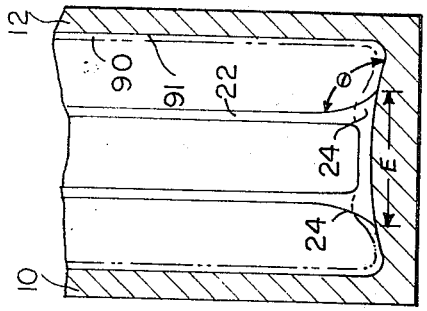
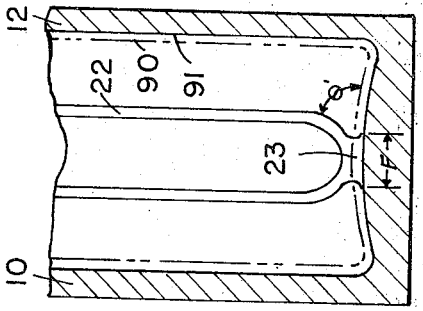

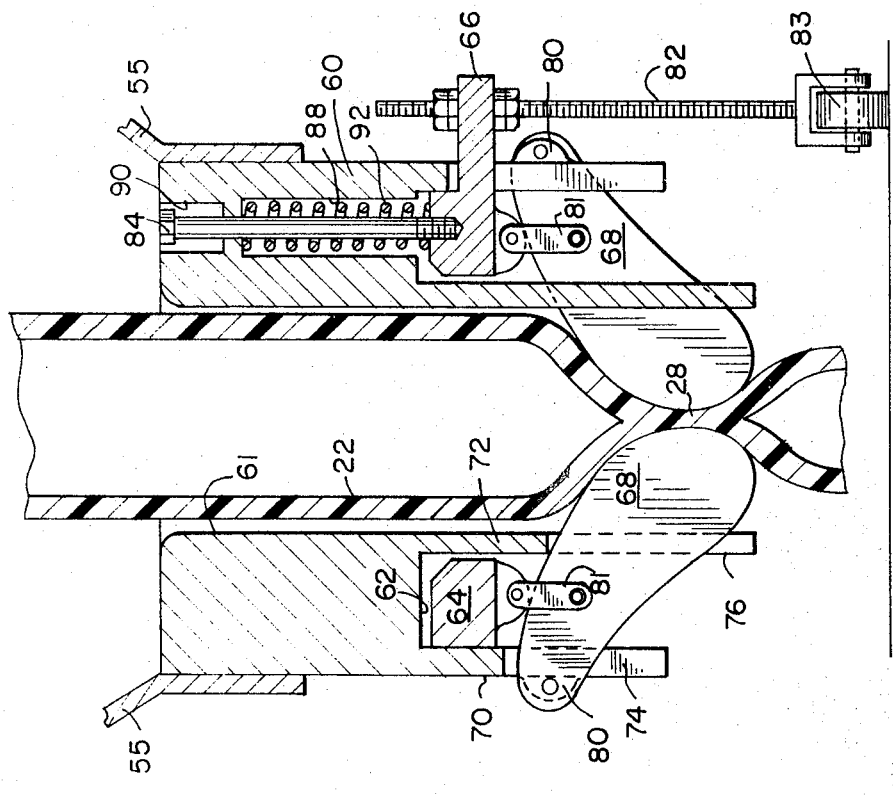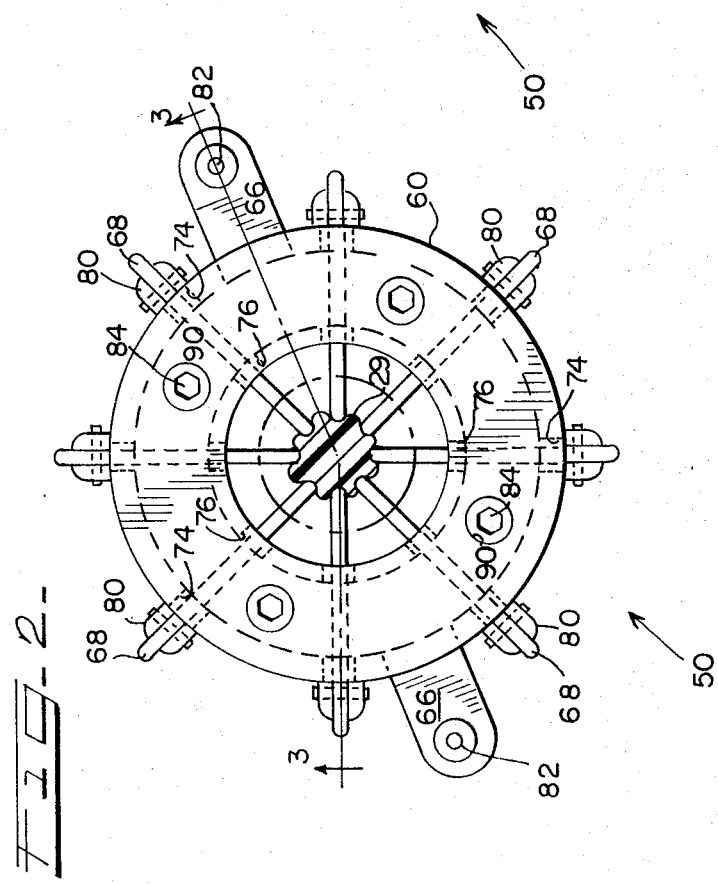

United States Patent Office 3,833,700
Patented Sept. 3, 1974

3,833,700
PROCESS FOR CLOSING TUBULAR PARISONS
AND BLOW MOLDING HOLLOW CONTAINERS
THEREFROM
Domas Adomaitis, Chicago, Ill., assignor to Continental
Can Company, Inc., New York, N.Y.
Filed Mar. 9, 1972, Ser. No. 233,136
Int. Cl. B29c 17/07
U.S. Cl. 264—96                            10 Claims

ABSTRACT OF THE DISCLOSURE

Process for blow molding hollow containers. A tubular parison is extruded and a portion thereof is closed to form a parison bottom by circumferentially reducing the diameter thereof and welding the interior surfaces together. A blow mold is aligned with its bottom in alignment with the parison bottom and a further portion of the parison is closed above the mold. The mold is closed about the parison and the parison is expended thereagainst, the closed mold grasping the first closed portion of the parison to form a weld line of reduced length.

BACKGROUND OF THE INVENTION

This invention relates to a plastic extrusion-blow molding process and includes apparatus for forming a parison with a closed end. More specifically, the instant invention will find acceptance in the formation of hollow plastic articles and especially containers for holding liquids.

THE PRIOR ART

In a conventional extrusion-blow molding process, thermoplastic material is usually extruded downwardly through an orifice in the form of a hot thermoplastic tube. Expansion molds which form a cavity therein are closed about segments of the tubular material normally referred to as a parison. These molds have parison closing or pinching means which are adapted to weld the upper and lower ends of the tube together to form a closed structure such that subsequent admission of air or other liquids will expand the thermoplastic tube against the interior cavity walls of the mold so as to form a finished article. In closing the blow mold about the thermoplastic tubular material, the interior walls of the tube at the upper and lower ends are merely pressed together to form a weld. Since the upper portion of the container which includes the weld line is normally severed from the remainder of the article in a finishing process, no detrimental effects result from this method of sealing the upper portion of the tubular parsion. However, with respect to the lower portion of the tubular parison, the closing of the mold results in the formation of the weld line or seam which is longer than the diameter of the extruded tube. If such an extruded tube is to be utilized in forming a container, the welded bottom may exhibit several undesirable characteristics. For example, the long weld line may result in unequal distribution of material in the bottom of the formed article. Additionally, the weld itself is often a poor weld, and the subsequent expansion may result in the formation of inherent stresses within the bottom of the container.

SUMMARY OF THE INVENTION

In an effort to provide more suitable containers for holding liquids, and to alleviate the above identified problems, the instant invention includes a process utilizing an apparatus for constricting the external diameter of the extruded tube and for welding the interior walls together so as to produce a short weld line which will minimize the uneven distribution of material in the formed article. Such apparatus may include a support surrounding the extruded tube above the expansion or blow molds which carries mechanical means for constricting the external diameter of the thermoplastic tube sufficient to weld the interior surfaces together and form a solid annular section of reduced diameter.

Accordingly, it is an object of this invention to provide a process for manufacturing containers of a thermoplastic material having superior strength characteristics. Too, it is an object of the instant inventon to provide a process utilizing an apparatus for obtaining a stronger weld line along the bottom of the container and for minimizing distortions in wall thickness of the bottom of such containers. Finally, it is an object of this invention to provide a process for manufacturing containers with bottom structures having more desirable characteristics.

DESCRIPTION OF THE DRAWINGS

The manner in which the objects of this invention is attained will be made clear by a consideration of the following specification and claims when taken in conjunction with the drawings in which:

FIG. 1 is a symbolic front elevation view of my invention in combination with an extruder device, and a mold apparatus;

FIG. 2 is a plan view of the instant invention for closing the parison;

FIG. 3 is a side elevation view of the instant invention taken along the lines 3—3 of FIG. 2;

FIG. 4 is a side elevation view of an expansion mold and a parison therein formed by the prior art processes;

FIG. 5 is a front elevation view of FIG. 4;

FIG. 6 is a plan view of FIG. 5 taken along the lines 6—6;

FIG. 7 is a side elevation view of an expansion mold and a parison which has been closed by the instant invention;

FIG. 8 is a front elevation view of FIG. 7; and

FIG. 9 is a plan view of FIG. 8 taken along the lines 9—9.

DETAILED DESCRIPTION

As depicted in FIG. 1, the instant invention, represented by the numeral 50 is designed to be utilized in conjunction with a conventional extruder 20 which delivers plasticized material 22 in tubular form downwardly so as to be received by left and right mold halves 10 and 12 of the conventional type. Such mold halves may be actuated by suitable hydraulic mechanism (not shown) through a cycle including a first position A in which the two mold halves are opened; a second position B in which the mold halves remain open but are moved upwardly in juxtaposition with the extruded tubing; position C in which the two mold halves are closed together about the extruded tube; and finally in position D in which the mold halves are moved downwardly with air being introduced into the parison by a needle or other conventional means so as to expand same against the interior walls of the cavity 91. This expansion will result in the production of a finished expanded article shown herein in the form of a container 90 which may be removed as the mold halves are moved from the closed position (D) to the open position (A).

With the exception of the parison closing means 50 of the instant invention, the above process is generally well known. References to FIGS. 4, 5 and 6 depict the form which the parison 22 will normally take in the absence of utilization of the instant invention and such may provide a better clarification of the advantages to be derived from this disclosure. For example, in FIG. 4, the weld line 23 which joins the interior portions of the tube together has a length represented by the arrow E, with material being accumulated at each end in the form of teardrops 24. As air is introduced into the parison for expansion the material at the ends of the weld line 23 will not have to be expanded as much as the material along each side 25, 25 of the weld line 23. Thus, the portion of the container on either side of the weld line may be excessively thin while the portion of the material along the weld line will be substantially thicker resulting in uneven strength characteristics. Additionally, it should be appreciated that with respect to FIG. 4, the parison just above the ends of the weld line 23 will have to be expanded or unfolded through a large angle $\theta$, and such expansion may build in inherent stresses within the bottom of the article.

However, with reference to FIGS. 7, 8 and 9, a parison formed with the instant invention has a line 23 with a substantially reduced diameter or length F. Due to the more annular configuration of the bottom of this parison, expansion thereof will result in less thinning of the material and provide container bottoms with more equal material distribution in all directions. Additionally, the angle $\theta'$ which represents the amount of reverse bending of thermoplastic material necessary in order for the parison to expand against the bottom of the container is also much smaller, thus reducing the inclusion of inherent stresses within the article.

Accordingly, it should be clear that the proper formation of the parison may enhance the strength characteristics of the bottom of an article such as a container, and in an effort to provide a more desirable preformed parison such as that depicted in FIGS. 7 through 9, the instant closing apparatus 50 is utilized. This apparatus includes a tubular member 60 supported by arms 55 from the extruder in a position just above the molds and includes means to prepinch or close the parison (at 28) through an annular constricting movement so as to reduce the linear dimension of the weld line 23. As thermoplastic material is continuously extruded, the constricting device 50 reopens to permit the tube to continue its downward movement with the molds being closed (Position C) about the reduced weld line. The prepinching means may comprise a body 60 with an internal bore 61 having a sufficiently greater diameter than the external diameter of a tubular parison 22 so as to preclude any frictional contact therebetween. Within the body 60 is an annular groove 62 which houses an annular actuating ring 64 for purposes hereinafter explained. Depending downwardly from the body 60 on either side of the annular groove 64 is an inner annular extension 72 and an annular outer extension 70, both of such extensions being interrupted by slits or cut outs 74 and 76. Formed on the external diameters of the outer extensions 70 is a series of lugs or ears 80 to which is pivotally connected the contracting or reducing members 68. These members 68 are also pivotally attached to the annular ring 64 by connecting members 81 through lugs 84 and pivotal connections as indicated. Inasmuch as the annular actuating ring 64 is free for vertical movement within the annular groove 62, it should be appreciated that upward movement will cause the reducing member 68 to pivot about the lugs or ears 80 so as to move inwardly and constrict the parison 22. Similarly, downward movement of the actuating ring 64 will permit the contracting members 68 to move downwardly and outwardly as they pivot about these lugs 80 so as to permit the parison 22 to return to its normal diameter. As shown in FIG. 2, eight such constricting members are attached to the actuating ring 64, and inward constricting movement against the hot parison 22 will cause the internal surfaces thereof to weld together to form folds in the parison at 29 as indicated in FIGS. 2 and 7.

The upward vertical movement of the actuating ring 64 which results in welding of the parison may be effected by the upward movement of the molds 10 and 12 coming into contact with actuating arms 82 located on either side of the annular body 60. This arm 82 is merely connected by a threaded connection to extensions 66 of the actuating ring 64. Preferably, an anti-friction device in the form of a wheel 83 is attached to the lower ends of the arms to reduce any friction between the actuating arm and the mold halves as they move to a closed position as viewed in FIG. 1.

The actuating ring 64 is retained within the annular groove 62 by a series of elongated bolts 84 which pass through bores 88 within the body 60. At the top of the body 60 is a counter bore 90 which carries the head of this retaining bolt, and a spring 92 is inserted between the actuating ring 64 and the upper portion of the bore 88 so as to urge the actuating member ring downwardly causing the contracting or reducing members 68 to move downwardly and outwardly.

MODE OF OPERATION

Accordingly, it should be clear that as the mold halves 10 and 12 are moved upwardly to position 8, they will come into contact with the actuating arm 82 to urge the actuating ring upwardly and to cause the contracting members to constrict the tubular parison 22, welding its internal walls together and reducing its external diameter. Subsequently, the mold halves 10 and 12 move rapidly together (Position C) so as to close about the parison. A portion of the extruded tube constricted on a previous cycle is grasped by the lower portion of the mold, with the upper portion of the mold merely severing the tubing at this point. This grasping or clamping action on the lower portion of the parison will insure that the parison remains concentric with the mold cavity as the parison is expanded against the cavity walls while the mold is moving downward. Opening of the molds (Position N) permits article removal and initiation of a new cycle. The plasticized tube with the new pinched section 28 will follow the molds downwardly with subsequent mold closing being coordinated such that the constricted portion 28 is pinched by the bottom portion of the mold. Obviously since the upper portion of the parison will be trimmed, no necessity is seen for prepinching or closing same.

Accordingly, it should be evident that applicant has proposed a preclosing or prepinching apparatus for utilization in conjunction with an extrusion blow mold process which will result in a formed container having a more desirable bottom portion in the sense that inherent stresses are precluded and more even distribution of material is obtained. It should be also appreciated that the applicant's preclosing apparatus may take many forms, and need not necessarily include the multiple number of contracting members 68. For example, an expansable chamber device which would expand about the parison through the utilization of air pressure may be sufficient. Too, it should be quite apparent that the applicant's instant invention may be actuated by solenoids or other controlled devices, and utilized in various types of extrusion blow molding machines.

I claim:

1. A process for forming hollow containers comprising the steps of:
    (a) extruding a thermoplastic material as a hot plasticized melt in a tubular form;
    (b) effecting a first closing of said tube to define a parison bottom by circumferentially reducing the diameter and welding the interior surfaces together to form a solid annular section of reduced diameter while the tubular material is still in a hot plasticized melt;
    (c) generally effecting alignment between the parison bottom and a like portion of an expansion mold;
    (d) effecting a second closing of the tube to define a second parison bottom in an intermediate portion of the tube above the expansion mold by circumferentially reducing the diameter and welding the interior surfaces together to form a solid annular section of reduced diameter while the tubular material is still in a hot plasticized melt;
    (e) closing the expansion mold about said extruded tube with the closed mold grasping the first closed portion of the tube to form a weld line of substantially reduced length in comparison to a line which would be formed by closing the mold on the tube as extruded; and (f) expanding the portion of the tube within the mold into a formed article.

2. The process of claim 1 wherein said mold severs said tube through said first closed tube portion.

3. The process of claim 1 wherein said second closing of said tube occurs prior to the closing of said mold.

4. The process of claim 3 wherein the closing of the mold results in a third closing of the tube between the first and second closings of the tube.

5. The process of claim 4 wherein in the closing of said mold the tube is severed at the third closing thereof.

6. The process of claim 3 wherein the second closing of the tube is effected by the positioning of the mold.

7. The process of claim 1 wherein after the first closing of the tube, the tube portion being extruded remains closed independently of the action of the mold.

8. The process of claim 1 wherein the closing of the tube is effected by means of a plurality of separate co-ordinated closing actions.

9. The process of claim 1 wherein the closing of the tube is effected by means of a plurality of separate co-ordinated closing actions, each being operative on a circumferentially limited portion of the tube with portions of the tube adjacent the closed portion generally retaining its original cross sectional shape.

10. The process of claim 1 wherein the closing of the tube is effected without severing of the tube at the point of closing.

References Cited

UNITED STATES PATENTS

| 3,514,812 | 6/1970 | Evers | 264—94 X |
| 3,579,622 | 5/1971 | Shaw et al. | 264—99 |
| 3,524,218 | 8/1970 | Butcher | 425—326 B X |
| 3,310,834 | 3/1967 | Simpson et al. | 264—99 X |

JAN H. SILBAUGH, Primary Examiner

U.S. Cl. X.R.

264—99, 248; 425—Dig. 206, Dig. 212